United States Patent [19]
Goebel

[11] Patent Number: 5,815,719
[45] Date of Patent: *Sep. 29, 1998

[54] METHOD AND APPARATUS FOR EASY INSERTION OF ASSEMBLER CODE FOR OPTIMIZATION

[75] Inventor: Kurt J. Goebel, Mountain View, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 643,895

[22] Filed: May 7, 1996

[51] Int. Cl.$^6$ ..................................................... G06F 9/45
[52] U.S. Cl. ........................... 395/707; 395/705; 395/709
[58] Field of Search .................................... 395/705, 709, 395/710, 707

[56] References Cited

U.S. PATENT DOCUMENTS

| | | | |
|---|---|---|---|
| 4,571,678 | 2/1986 | Chaitin | 364/300 |
| 4,667,290 | 5/1987 | Goss et al. | 364/300 |
| 5,175,856 | 12/1992 | Van Dyke et al. | 395/700 |
| 5,249,295 | 9/1993 | Briggs et al. | 395/650 |

OTHER PUBLICATIONS

"Direct Synthesis of Optimized DSP Assembly Code from Signal Flow Block Diagrams", Powell et al., IEEE Int'l Conf. on Acoustics, Speech and Signal Processing, 1992, pp. 553–556.

Alfred V. Aho et al., "Compilers Principles, Techniques and Tools," Addison–Wesley, (1988), Chapter 8, pp. 463–512.

Article by Ronald E. Kole, entitled "Optimizing Compiler Exploits DSP Features," High Performance Systems, vol. 11, No. 2, Feb. 1990, pp. 40–45.

Article by David Shear, entitled "HLL compilers and DSP run–time libraries make DSP–system programming easy," Electronic Design Neus, vol. 33, No. 13, Jun. 23, 1988, pp. 69–72 and 75 and 76 (pp. 73–74 missing).

Article by R.B. Grove, D.S. Blickstein, K.D. Glossop and W.B. Noyce entitled "GEM Optimizing Compilers for Alpha AXP Systems," Comcon Spring '93—Digest of papers, San Francisco, Feb. 22–26, 1993, pp. 465–473.

*Primary Examiner*—Emanuel Todd Voeltz
*Assistant Examiner*—Kakali Chaki
*Attorney, Agent, or Firm*—Graham & James LLP

[57] ABSTRACT

Small assembly code routines are inlined with source code prior to optimization processing in a compiler in a data processing system. Each assembly code routine is presented to the compiler in the form of a template having instructions and operands. Whenever a call to the template is detected by the compiler, the instructions and operands of the template are examined by the compiler to determine whether all instructions and operands in the template are recognizable by the compiler for optimization processing. If so, the assembly code template is virtualized by transforming physical registers to virtual registers, and the intermediate code form of the template is combined with the intermediate code form of the source code. This combined code is then subjected to optimization procedures in the compiler, and the result is used to generate the assembly code. The assembly code from any template not eligible for early inlining is later inlined with the assembly code generated by the compiler after the optimization processing.

20 Claims, 6 Drawing Sheets

METHOD AND APPARATUS FOR EASY INSERTION OF ASSEMBLER CODE FOR OPTIMIZATION

BACKGROUND OF THE INVENTION

This invention relates to code optimization in data processing systems during program compile time. More particularly, this invention relates to a technique for improving the optimization of small assembly code routines during program compile time The use of compilers in data processing systems to generate assembly code from high level source code is well known. Current compilers employ a variety of optimization techniques in order to generate assembly code capable of more efficiently executing program routines. Examples of such optimization techniques are spill code optimization, register allocation using interference graph coloring techniques (such as the techniques disclosed in U.S. Pat. Nos. 4,571,678 and 5,249,295), and stack storage management.

In a typical implementation of a compiler having optimization routines, the source code is initially translated into an intermediate form, the optimization is performed on the intermediate code, and the result is assembled into the final assembly code as the last stage in the process.

While the various optimization techniques have been found to be generally useful in enabling the generation of efficient assembly code, certain routines have traditionally been incorporated into the final assembly code by bypassing the optimization procedures and inserting hand-written assembly code in the final stage of the compiler. These assembly routines are typically small routines such as a population count (e.g. calculate the number of bits in a particular operand), setting a status register, and the like.

One known technique for accomplishing this purpose is to include in the code generator a mechanism for assembly language insertions during a final step of the compiler, which is known as inlining. In general, the inlining capability permits users to call routines which are implemented with assembly language templates organized into special files with a distinct extension. As noted above, these assembly language templates are typically inlined late in the compilation process after all the high level code has been subjected to the optimization procedures and reduced to an assembly language form. Since many optimization procedures critical to processor performance have already occurred before the inlining of the assembly language templates, these inserted assembly instructions are often poorly optimized within the context of the insertion.

SUMMARY OF THE INVENTION

The invention provides a technique for permitting early inlining of assembly code templates in appropriate cases so that the assembly code can be subjected to all the optimization procedures incorporated into a compiler, with the resulting more efficient generation of assembly code.

From a process standpoint, the invention comprises a method of inserting an assembly code routine into a source code routine prior to optimization in a data processing system compiler, said method comprising the steps of: providing an assembly code template having the instructions and operands of the assembly code routine, providing a recognized set of recognized instructions recognizable by the compiler for code optimization, scanning the instructions and operands of the template to determine whether all instructions and operands of the template are included in the set of recognized instructions. If the template can be optimized, the compiler performs the steps of: virtualizing the template, transforming the assembly code into an intermediate form usable by the compiler, transforming the source code into an intermediate form usable by the compiler, and combining the intermediate form assembly code and the intermediate form source code.

The step of virtualizing the template preferably includes the steps of identifying physical register assignments within the template, and transforming the physical register assignments into virtual register assignments. The steps of identifying and transforming are preferably sequentially performed on the input operands and the output operands in the assembly code template.

The combined intermediate form assembly code and source code are subjected to the optimization procedures performed by the compiler. After the optimization procedures are completed, the compiler generates assembly code. For those assembly code templates deemed ineligible for early inlining, these ineligible assembly code routines are later inlined into the result of the optimization procedure during the generation of the assembly code by the compiler.

From a system standpoint, the invention comprises a central processing unit (CPU) having a memory unit for storing assembly code, a source code supply specifying program routine for use by the CPU, a source of assembly code routines in the form of templates having instructions and operands, a compiler for generating assembly code from the source code and the assembly code routines, said assembly compiler including at least one optimization procedure, and a set of recognized instructions recognizable by the compiler for code optimization. The compiler further includes a first procedure for scanning the instructions and operands in a given assembly code template to determine whether all instructions and operands in the template are included in the recognized set, and a second procedure for inlining the assembly code template into the source code prior to the optimization procedure whenever all instructions and operands in a given assembly code template are included in the recognized set.

The compiler inlining procedure includes a procedure for virtualizing a template, a procedure for transforming the assembly code in the template into an intermediate form, a procedure for transforming the source code into an intermediate form, and a procedure for combining the intermediate form assembly code and the intermediate form source code. The procedure for virtualizing the template includes a procedure for identifying physical register assignments within the template and transforming the physical register assignments into virtual register assignments. The identifying and transforming procedures are preferably sequentially performed on the input operands and the output operands.

The compiler further preferably includes a procedure for generating assembly code from the result of the at least one optimization procedure, as well as a procedure for inlining into the assembly code the assembly code from any assembly code template having an instruction or an operand not included in the recognized set.

The invention enables small assembly code routines to be inlined early with the surrounding source code routines prior to performing optimization processing within the compiler. As a result, more effective optimization is performed, which results in the generation of assembly code capable of more effective execution of a given program.

For a fuller understanding of the nature and advantages of the invention, reference should be had to the ensuing detailed description, taken in conjunction with the accompanying drawings.

DETAILED DESCRIPTION OF THE PREFERRED EMBODIMENTS

Figure 1:
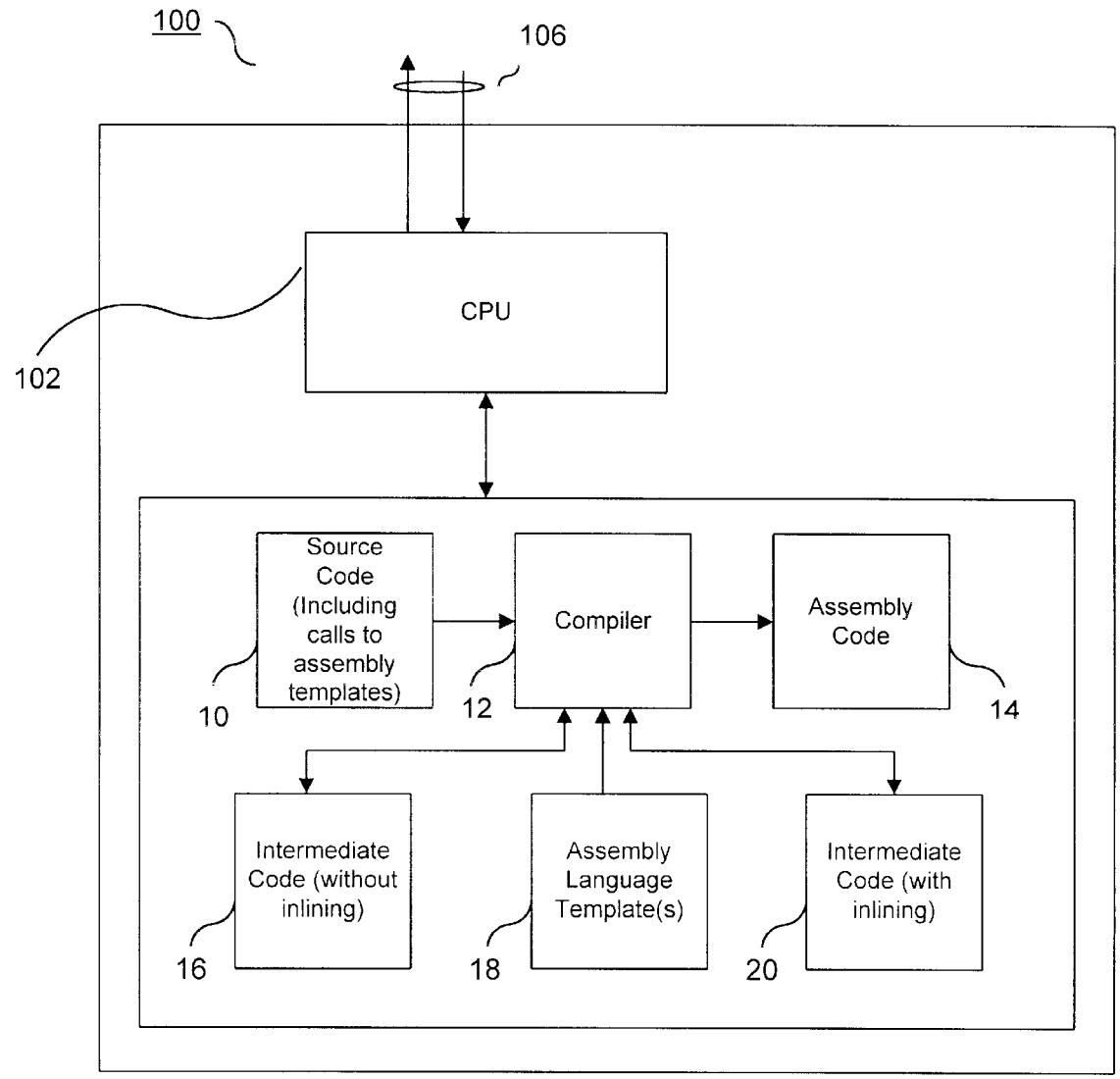
Fig. 1 is a block diagram of a data processing system incorporating the invention.

Turning now to the drawings, FIG. 1 is a block diagram of a data processing system 100 incorporating the invention. Data processing system 100 includes a CPU 102, a memory 104, and I/O lines 106. Memory 104 includes source code 10, compiler software 12, assembly code 14, an intermediate representation 16 of the source code 10, an assembly language template 18, and an intermediate representation 20 of the source code 10 after inuining. It will be understood by persons of ordinary skill in the art that data processing system 100 can also include numerous elements not shown in the Figure for the sake of clarity, such as disk drives, keyboards, display devices, network connections, additional memory, additional CPUs, LANs, etc.

Figure 2:
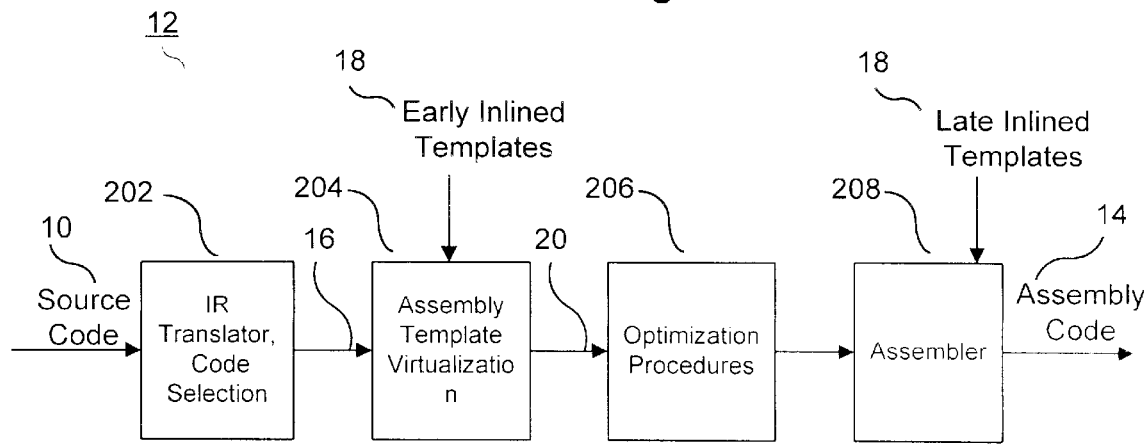
FIG. 2 is a functional diagram illustrating various portions of the compiler of FIG. 1.

FIG. 2 illustrates the major portions of compiler 12. As seen in this figure, source code from source 10 is initially supplied to an internal representation (IR) translator 202 in which the source code is converted to intermediate representation 16. An example of a C language procedure "main" that calls an assembly language template is:

```
main()
{
    getzero()
}
```

Figure 3A:
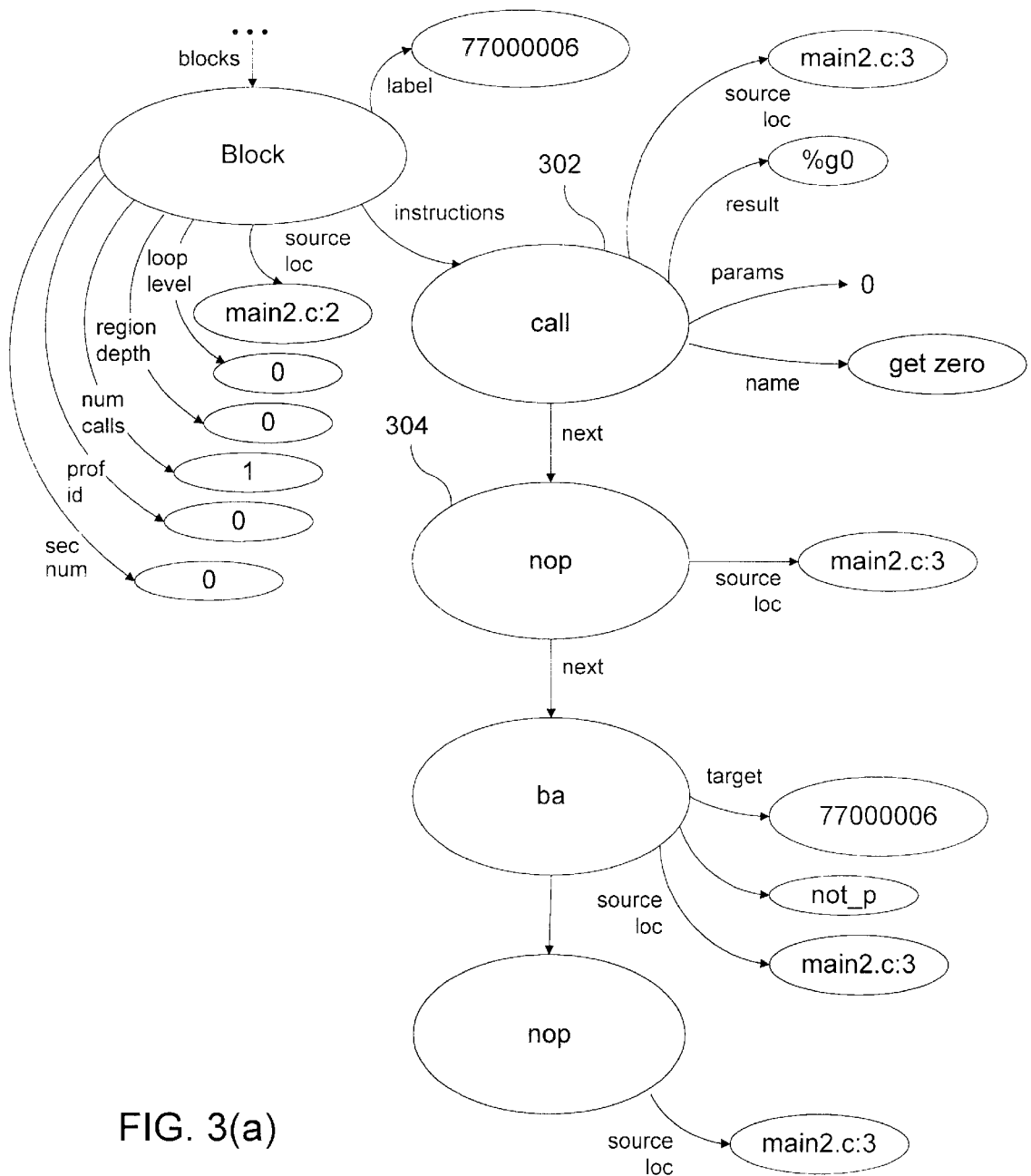
FIG. 3(a) is a graph of an internal representation of code for a main procedure generated by the compiler before inlining.

This procedure calls an assembly language template "getzero" having no parameters. An example of an intermediate representation of the procedure main is shown in FIG. 3(a) and discussed in further detail below.

An example of the SPARC assembly language template getzero called by the main procedure is as follows:

```
.inline getzero,0
st      %g0,[%sp+0x44]
ld      [%sp+0x44],%o0
.end
```

Figure 3B:
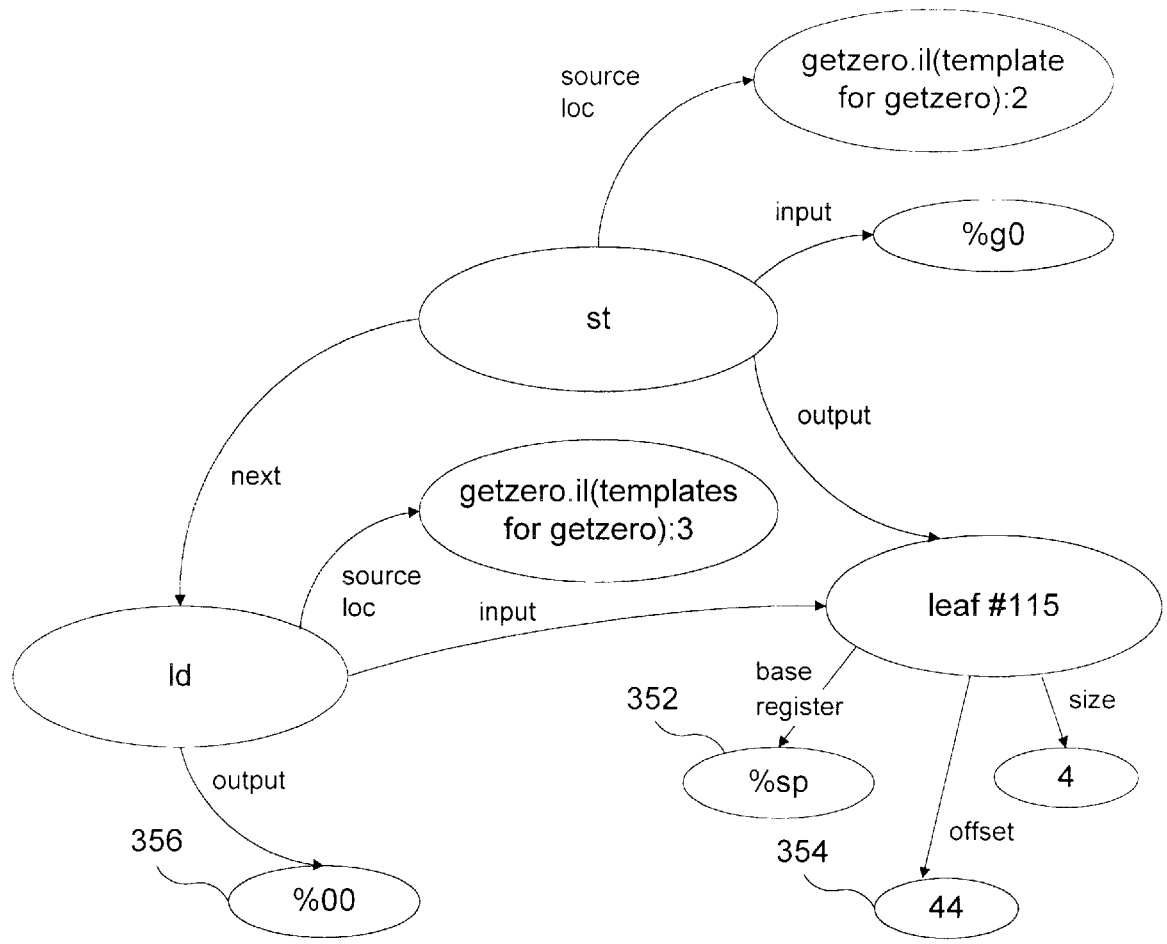
FIG. 3(b) is a graph of an internal representation of code for an assembly template generated by the compiler before inlining.

The assembly language template "getzero" has no parameters and consists of a load instruction and a store instruction. SPARC is a trademark of SPARC International, Inc. An example of an intermediate representation of the template getzero is shown in FIG. 3(b) and discussed in further detail below. The process to effect a transformation to intermediate form is well-known to persons of ordinary skill in the art and will vary depending on the processor and type of languages used in a given implementation. See e.g., "Compilers" Principles, Techniques and Tools,"by Aho, Sethi, and Ullman, Chapter 8, published by Addison-Wesley, 1988, which is herein incorporated by reference.

An Assembly Template Virtualization process 204 combines the internal representation 16 of the source code with the internal representation of eligible externally supplied assembly templates 18 in the manner described below. This process is termed "early inlining". Thereafter, the combined intermediate representation of the source code and the intermediate representation of the assembly code are subjected to the full array of optimization procedures 206 modeled into the compiler. The result of the optimization procedures is input to assembler 208, which generates the assembly code module 14. Small assembly templates/ routines deemed ineligible for inlining prior to optimization are inlined with the assembly code 14 generated by assembler module 208.

Figure 5:
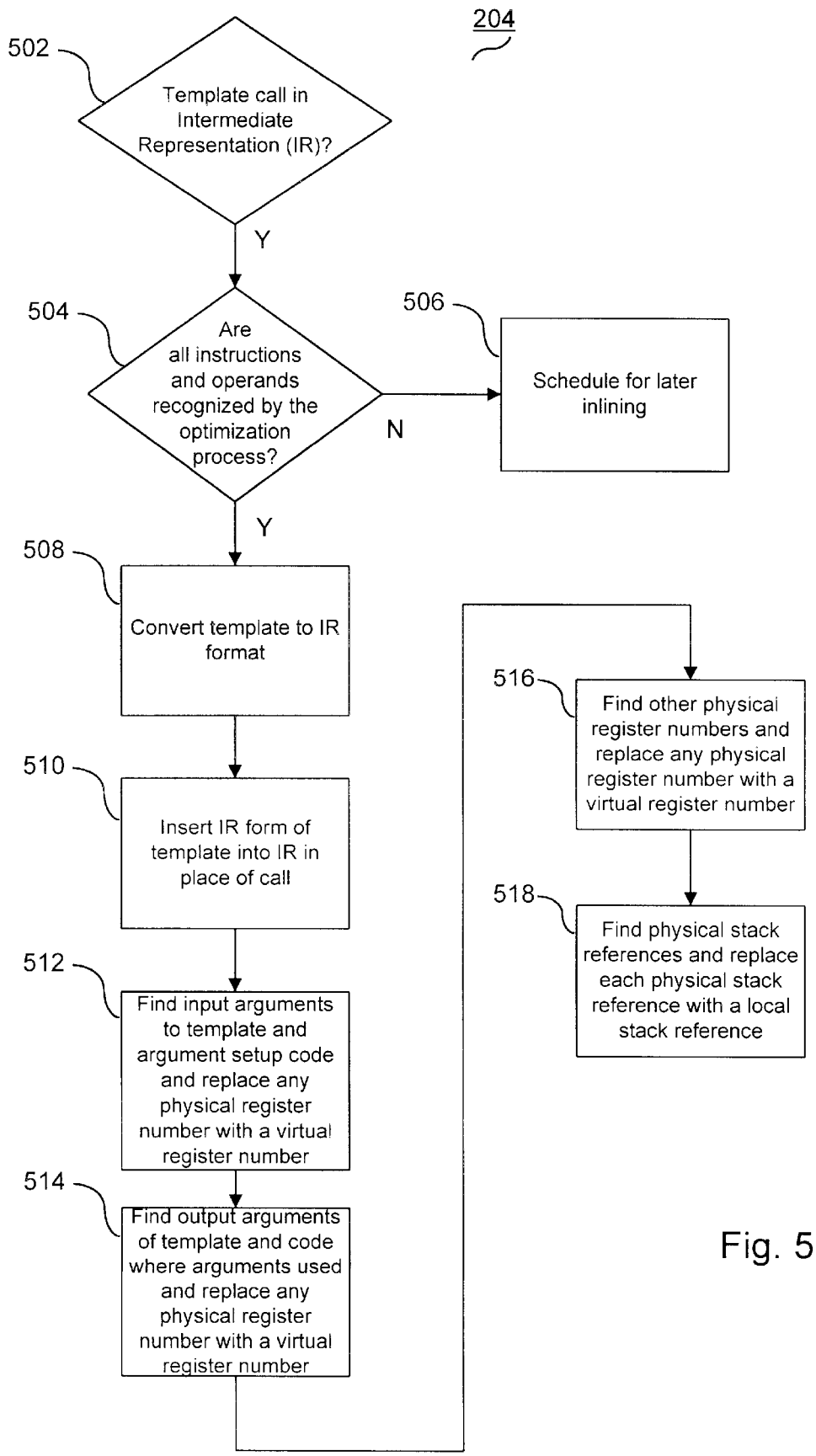
FIG. 5 is a flow chart showing steps performed by the compiler during early inlining.

FIG. 5 is a flow chart of steps performed to do early inlining of assembly language routines by compiler 12. Specifically these steps, are performed by CPU 102 executing instructions of assembly template virtualization process 204. The following example uses procedure "main"and template "getzero" provided above.

As shown in FIG. 5, the early inlining process proceeds as follows. In steps 502, the IR of source code 10 of main is reviewed for calls to an assembly language template. Whenever a call to an assembly language template is encountered in step 502 the called template is reviewed to determine if it can be inlined early. To make this determination, in step 504 each instruction and operand in the template is compared with a prepared list of recognized instructions and operands stored in memory 104. If not all instructions and operands in the template are recognized by the optimization process, the assembly code represented by the template is scheduled for insertion (late inlining) at the assembler stage of process 208 in step 506.

Otherwise, if all instructions and operands are recognized, i.e., can be handled by optimizer 206, the assembly template code 18 is converted into an intermediate representation form in step 508 using techniques known to persons of ordinary skill in the art. See e.g., "Compilers" Principles, Techniques and Tools," by Aho, Sethi, and Ullman, Chapter 8, published by Addison-Wesley, 1988, which is herein incorporated by reference. FIG. 3(b) discussed below provides an example of intermediate representation of the template getzero.

The intermediate form of the template is then inlined into the intermediate form of the source code and virtualized. (In some implementations, virtualization occurs before the intermediate representations are combined). The physical registers and stack pointer references in the template are virtualized by replacing actual physical registers with virtual registers and virtual stack pointers in steps 512–518, as described below.

As a result, the assembly code represented by the assembly language template has been transformed into the intermediate form that is utilized by the compiler 12 just as the surrounding high level language constructs from the source code have been transformed. Thereafter, the inserted instructions are fully optimized along with the rest of the code in process 206 so that normal optimization (including such known processes as global scheduling, pipelining, global register optimization, etc.) can be performed.

The list of instructions and operands of step 504 can contain any instructions and/or operands, the only criteria for inclusion in the list being that the optimization process 206 be able to optimize the instructions or operands when it encounters them during optimization. For example, if the optimizer 206 of a preferred embodiment does not recognize (or optimize) references to the SPARC floating point %fsr register, templates referencing that register cannot be early inlined. As a second example, if the optimizer 206 of a preferred embodiment does not recognize the "popc" instruction, templates containing that instruction cannot be early inlined.

If all instructions and operands are supported and all operands are modeled, the template is considered eligible for early inlining. In step 510 the call (see elements 302 and 304 of FIG. 3(a)) is removed and the determined template (see FIG. 3(b)) is inserted in the place of the call.

Figure 6A:
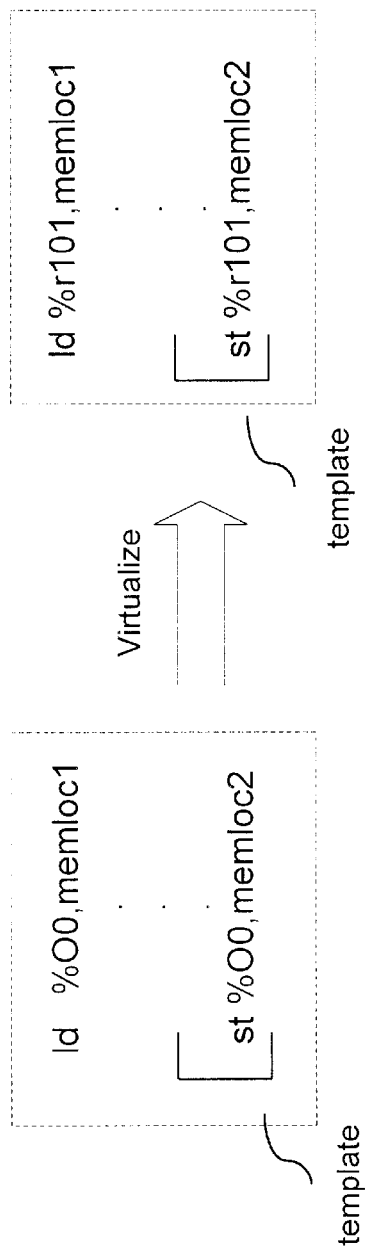
FIGS. 6(a) and 6(b) show examples of code where physical register numbers have been converted to virtual register numbers.
Figure 6B:
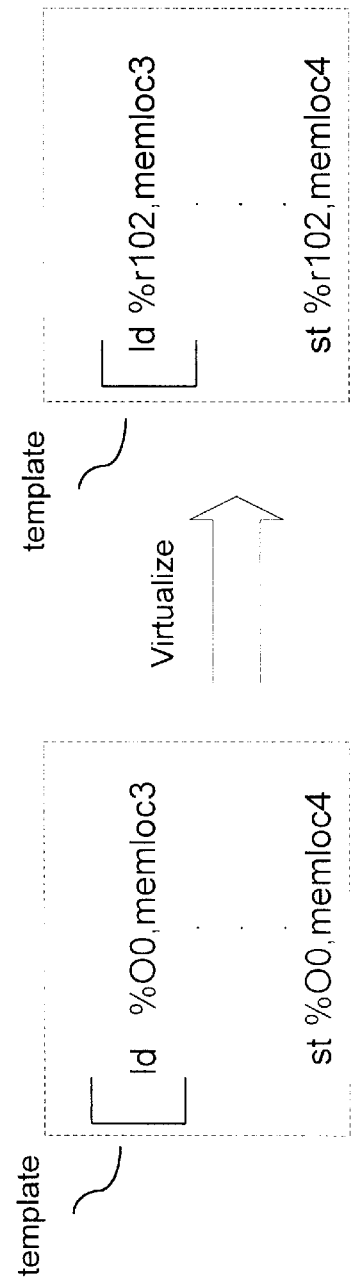

Once inserted, the register operands of the inline template are then virtualized in the following manner. In step 512, any input arguments to the template are first identified. The argument setup code for the arguments is then detected and analyzed. Physical register assignments are then transformed into virtual registers. For example, FIG. 6(a) shows an example where register %o0 contains an input argument for the template and where a value is loaded into register %o0 prior to the location where the template will be inserted. At both locations, %o0 is changed to next available, virtual register (in this case %r101). Next, in step 514 any output arguments of the template are identified as well as places in the calling routine that use the output arguments, and physical registers are changed to virtual registers. FIG. 6(b) shows an example of such a reassignment, in which physical register %o0 is changed to virtual register %r102. Next, in step 516, the body of the inline template is then reviewed for further physical register usage. Any detected use of a physical register is transformed into a next available virtual register. (In a preferred embodiment, register %g0 is not virtualized because it is a read-only register having a hardwired value of "0"). In step 518, uses of physical stack memory locations uses are detected and reassigned to local stack locations (compare the stack pointer reference in FIGS. 3(b) and 4).

After completing virtualization, all traces of the inline call have been removed. The result appears to the compiler 12 as if the instructions forming the template had been generated from the high level language from source 10. As a consequence, subsequent code optimization phases in compiler 12 are not constrained in any way.

A fragment of the internal representation 16 (also called "IR") of the procedure main before early inlining is:

```
BLOCK:label = .L77000006        !(main2.c:2)
   loop_level = region_depth = 0 num_calls = 1 prof_id = 0 sec_num = 0
   call  getzero,0        ! Result = %g0 ! (main2.c:3)
   nop   !(main2.c:3)
   ba    .L77000007       ! not_p !(main2.c:3)
   nop   ! (main2.c:3)
```

FIG. 3(a) shows a graphical representation of the IR for main stored in memory 104. Note that the IR initially contains a call 302 to the template "getzero."

A fragment of the internal representation of the template "getzero" main before early inlining is:

```
st   %g0,[d0,us)%sp+0x44/*#115,sz=4*/]        !(getzero.il (template for getzero):2)
ld   [(d0,u2)%sp+0x44/*#115,sz=4*/],(d1,u1)%o0!(getzero.il (template for getzero):3)
```

FIG. 3(b) shows a graphical representation of the IR for template getzero stored in memory 104.

The IR fragment for main after early inlining of template getzero and virtualization is:

```
BLOCK: label = .L77000006        !(main2.c:2)
   loop_level = 0 region depth = 0 num_calls = 0 prof_id = 0 sec_num = 0
   st   %g0,[d0,u2)%fp+-16/*#115,sz=4*/]              ! (getzero.il(template for getzero):2)
   ld   [(d0,u2)%fp+-16/*#115,sz=4*/],(d1,u1)%r100    ! (getzero.il(template for getzero):3)
   ba   .L77000007    ! not_p ! (main2.c:3)
   nop  ! (main2.c:3)
```

Figure 4:
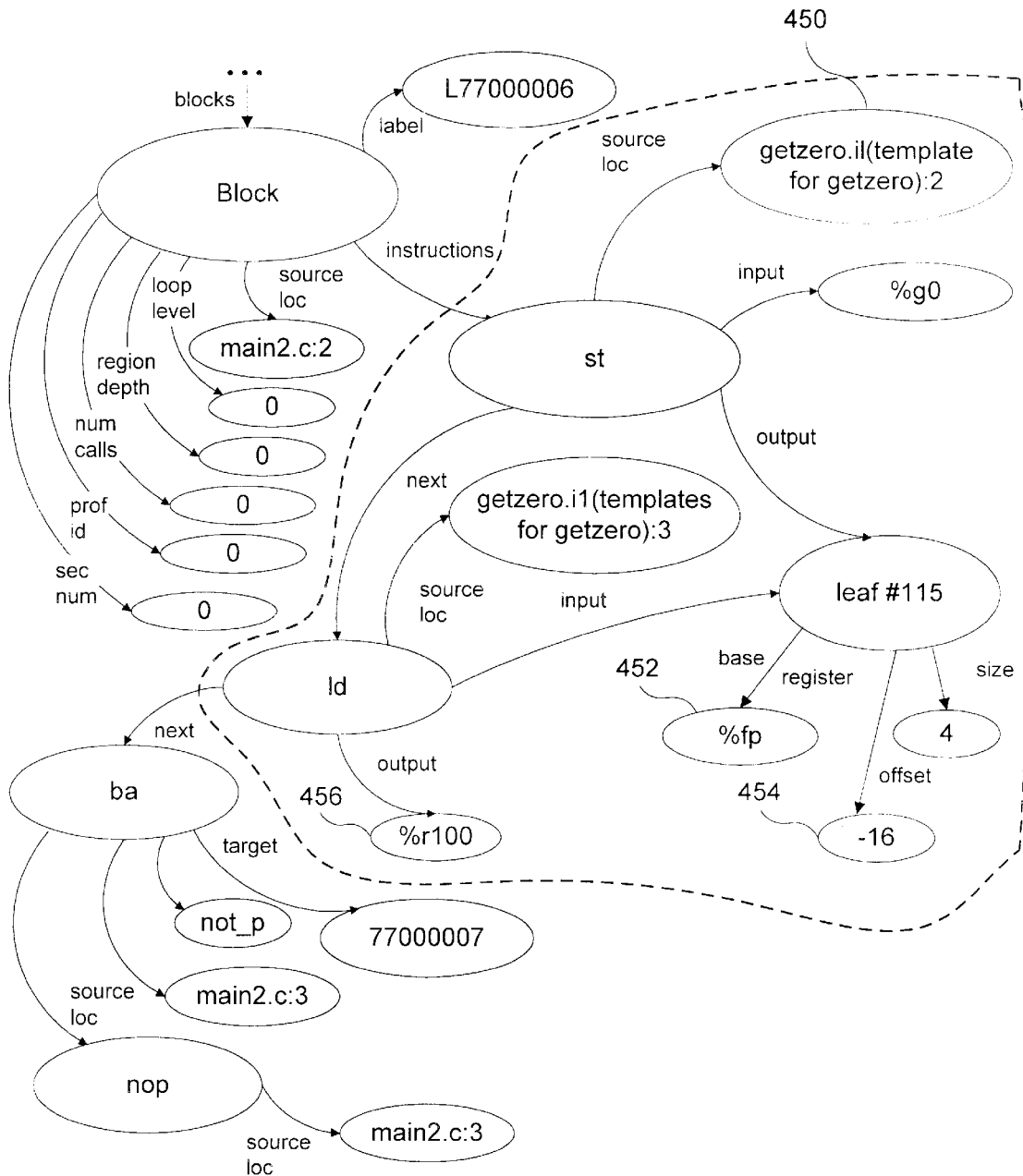
FIG. 4, a graph of an internal representation of code for the main procedure after early and virtualization of the assembly language template in accordance with the present invention.

FIG. 4 shows the IR representation of procedure main after early inlining and virtualization. Note that the template getzero has replaced the call 302,304 to getzero. Note also that the reference to physical register %o0 has been replaced with a reference to the virtual register %r100. The reference to physical stack location %sp+0x44 has been replaced with a reference to local stack location %fp+−16. (In the example, both %r100 and %fp+−16 are completely arbitrary, and merely represent the next available virtual register and the next available local stack location.) The template's virtualized instructions are now ready for the code generator's optimization phases. In the example, the template's output, register %r100 is not used by the C code of the main routine. Similarly, the stack location fp+−16 is not needed. As a result, the entire template is optimized away by optimization routine 206:

```
! SUBROUTINE main
!
! OFFSET     SOURCE LINE LABEL    INSTRUCTION
              .global main
              main:
/* 0x0000       */        retl
/* 0x0004       */        nop
```

Thus, in this simple example, early inlining allows the optimization routine 206 to determine that the inlined routine is unnecessary and to remove it.

As will now be apparent, the invention enables some small assembly code routines to be combined with the source code prior to the optimization procedures in compiler 12. Consequently, those eligible routines can be optimized along with surrounding portions of the code originating with source 10 to enhance the overall performance of the assembly code. In addition, for those assembly code routines which are ineligible for the early inlining with source code, these ineligible routines are processed in the standard way: viz. by later inlining in the assembler module.

While the above provides a full and complete disclosure of the preferred embodiment of the invention, various modifications, alternate constructions and equivalents will occur to those skilled in the art. Therefore, the above should not be construed as limiting the invention, which is defined by the appended claims.

What is claimed is:

1. A method of inserting an assembly code routine into a source code routine prior to optimization in a data processing system compiler, said method comprising the steps of:

providing an assembly code template having the instructions and operands of the assembly code routine;

providing a set of recognized instructions recognizable by the compiler for code optimization;

scanning the instructions and operands of the template to determine whether all instructions and operands of the template are included in the set of recognized instructions; if so, virtualizing the template;

transforming the assembly code in the template into an intermediate form usable by the compiler;

transforming the source code into an intermediate form usable by the compiler; and combining the intermediate form assembly code and the intermediate form source code.

2. The method of claim 1 wherein said step of virtualizing the template includes the steps of identifying physical register assignments within the template, and transforming the physical register assignments into virtual register assignments.

3. The method of claim 2 wherein said assembly code template has input operands and output operands; and wherein said steps of identifying and transforming are sequentially performed on input operands and output operands.

4. The method of claim 1 further including the step of subjecting the combined intermediate form assembly code and intermediate form source code to at least one optimization procedure.

5. The method of claim 4 further including the step of generating assembly code from the result of the at least one optimization procedure.

6. The method of claim 5 further including the step of inlining into the result of the at least one optimization procedure any assembly code routine having any instruction or operand not included in said recognized set.

7. A computer system, comprising:

a central processing unit (CPU) having a memory unit for storing assembly code;

a source code supply specifying program routine for use by the CPU;

a source of assembly code routines in the form of templates having instructions and operands;

a compiler for generating assembly code from the source code and the assembly code routines, said assembly compiler including at least one optimization procedure; and a set of recognized instructions recognizable by the compiler for code optimization;

said compiler further including a first procedure for scanning the instructions and operands in a given assembly code template to determine whether all instructions and operands in the template are included in the recognized set, and a second procedure for inlining the assembly code template into the source code prior to the optimization procedure whenever all instructions and operands in a given assembly code template are included in the recognized set.

8. The computer system according to claim 7 wherein the inlining procedure includes a procedure for virtualizing the template, a procedure for transforming the assembly code in the template into an intermediate form, a procedure for transforming the source code into an intermediate form, and a procedure for combining the intermediate form assembly code and the intermediate form source code.

9. The computer system of claim 8 wherein the procedure for virtualizing the template includes a procedure for identifying physical register assignments within the template and transforming the physical register assignments into virtual register assignments.

10. The computer system according to claim 9 wherein the assembly code template includes input operands and output operands; and wherein the identifying and transforming procedures are sequentially performed on the input operands and the output operands.

11. The system of claim 7 wherein said compiler further includes a procedure for subjecting the combined intermediate form assembly code and source code to at least one optimization process.

12. The system of claim 11 wherein the compiler includes a procedure for generating assembly code from the result of the at least one optimization procedure.

13. The system according to claim 12 wherein the compiler includes a procedure for inlining into the assembly code the assembly code from any assembly code template having an instruction or an operand not included in said recognized set.

14. A computer program product, comprising:

a computer usable medium having computer readable code embodied therein for causing early inlining of an assembly language template prior to a compiler optimization process, the computer program product comprising:

a source code supply specifying program routine for providing the source code to the compiler;

an assembly code template supplying routine, supplying to the compiler templates having instructions and operands;

a compiler for generating assembly code from the source code and the assembly code routines, said assembly compiler including at least one optimization procedure; and a set of recognized instructions recognizable by the compiler for code optimization;

said compiler further including a first procedure for scanning the instructions and operands in a given assembly code template to determine whether all instructions and operands in the template are included in the recognized set, and a second procedure for inlining the assembly code template into the source code prior to the optimization procedure whenever all instructions and operands in a given assembly code template are included in the recognized set.

15. The computer program product according to claim 14 wherein the inlining procedure includes a procedure for virtualizing the template, a procedure for transforming the assembly code in the template into an intermediate form, a procedure for transforming the source code into an intermediate form, and a procedure for combining the intermediate form assembly code and the intermediate form source code.

16. The computer program product of claim 15 wherein the procedure for virtualizing the template includes a procedure for identifying physical register assignments within the template and transforming the physical register assignments into virtual register assignments.

17. The computer program product according to claim 16 wherein the assembly code template includes input operands and output operands; and wherein the identifying and transforming procedures are sequentially performed on the input operands and the output operands.

18. The computer program product of claim 14 wherein said compiler further includes a procedure for subjecting the combined intermediate form assembly code and source code to at least one optimization process.

19. The computer program product of claim 18 wherein the compiler includes a procedure for generating assembly code from the result of the at least one optimization procedure.

20. The computer program product according to claim 19 wherein the compiler includes a procedure for inlining into the assembly code the assembly code from any assembly code template having an instruction or an operand not included in said recognized set.

* * * * *